United States Patent
Lan et al.

(10) Patent No.: US 10,860,050 B2
(45) Date of Patent: Dec. 8, 2020

(54) APPARATUS AND METHODS FOR NON-LINEAR FUNCTION OPERATIONS

(71) Applicant: Cambricon Technologies Corporation Limited, Beijing (CN)

(72) Inventors: Huiying Lan, Beijing (CN); Qi Guo, Beijing (CN); Yunji Chen, Beijing (CN); Tianshi Chen, Beijing (CN); Shangying Li, Beijing (CN); Zhen Li, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 176 days.

(21) Appl. No.: 16/164,689

(22) Filed: Oct. 18, 2018

(65) Prior Publication Data

US 2019/0050369 A1 Feb. 14, 2019

Related U.S. Application Data

(63) Continuation-in-part of application No. PCT/CN2016/079656, filed on Apr. 19, 2016.

(51) Int. Cl.
G06F 1/03 (2006.01)
G06F 17/11 (2006.01)
G06F 7/544 (2006.01)

(52) U.S. Cl.
CPC .............. *G06F 1/03* (2013.01); *G06F 7/544* (2013.01); *G06F 17/11* (2013.01)

(58) Field of Classification Search
CPC ............. G06F 2101/02; G06F 2101/04; G06F 2101/08–12; G06F 1/03–0307; G06F 1/035–0356

(Continued)

(56) References Cited

U.S. PATENT DOCUMENTS 6,681,237 B1 * 1/2004 Fossum ................. G06F 1/0307
708/606
2017/0286106 A1 * 10/2017 Ben-Dayan Rubin ....................
G06N 7/005
2018/0329681 A1 * 11/2018 Zhang ........................ G06F 7/57

FOREIGN PATENT DOCUMENTS

CN 105354006 A 2/2016
GB 2185606 A * 7/1987 ............... G06T 9/20
WO WO 2017/181342 A1 10/2017

OTHER PUBLICATIONS

T. Chen, et al., "A Small-Footprint Accelerator for Large-Scale Neural Networks", ACM Transactions on Computer Systems, vol. 33, No. 2, Article 6, May 2015, 27 pages.

(Continued)

*Primary Examiner* — Matthew D Sandifer
(74) *Attorney, Agent, or Firm* — Getech Law LLC; Jun Ye (57) ABSTRACT

A nonlinear function operation device and method are provided. The device may include a table looking-up module and a linear fitting module. The table looking-up module may be configured to acquire a first address of a slope value k and a second address of an intercept value b based on a floating-point number. The linear fitting module may be configured to obtain a linear function expressed as y=k×x+b based on the slope value k and the intercept value b, and substitute the floating-point number into the linear function to calculate a function value of the linear function, wherein the calculated function value is determined as the function value of a nonlinear function corresponding to the floating-point number.

19 Claims, 6 Drawing Sheets

(58) Field of Classification Search
USPC .......................................................... 708/272
See application file for complete search history.

(56) References Cited

OTHER PUBLICATIONS

Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
PCT/CN2016/079656—International Search Report, dated Jan. 16, 2017, 8 pages. (no English translation).

* cited by examiner

APPARATUS AND METHODS FOR NON-LINEAR FUNCTION OPERATIONS

CROSS-REFERENCE TO RELATED APPLICATIONS

The present invention is a continuation-in-part of PCT Application No. PCT/CN2016/079656, filed on Apr. 19, 2016, and incorporates by reference to CN application number 201610245348.6, filed on Apr. 19, 2016. The entire content of each of the aforementioned applications is incorporated herein by reference.

TECHNICAL FIELD

This disclosure relates to the field of computers, and more particularly to a nonlinear function operation device and method.

BACKGROUND

An arithmetic logic unit (ALU) is a structure that performs integer arithmetic. In computers, an ALU is a digital circuit that performs arithmetic and logic operations exclusively. ALUs are the most important part of the computer's central processor. Even the smallest microprocessor includes an ALU for counting. At present, powerful and complex ALUs have been configured in central processing units (CPUs) and graphics processing units (GPUs). A single component can also include ALUs. Most ALUs can perform the following operations: integer arithmetic operations (for example, an addition operation, a subtraction operation, sometimes including a multiplication operation and a division operation with a higher cost), bitwise logical operations (for example, an AND operation, an OR operation, a NOT operation, and an exclusive-OR operation, etc.), and arithmetic shift operations (that is, arithmetic left shift, arithmetic right shift, or moving a given number of bit-positions), where shifting by 1 bit on a signed or unsigned binary number has the effect of multiplying it by 2 or dividing it by 2. An ALU generally only includes linear operation modules. When the ALU performs a complex exponentiation or other operations, it usually requires several operation cycles.

In order to speed up the processing speed of a processor, a floating-point unit (FPU) is generally integrated in the CPU and the GPU. The FPU is a dedicated processor for floating-point operations and may support some calculations for some transcendental functions, such as log 2x.

In the related art, when calculating a nonlinear function, a complex operation is usually disassembled into several simple operations, and only after several operation cycles can a result be obtained. This will lead to a lower operation speed, a larger area of the operation device, and higher power consumption.

SUMMARY

Technical Problems to be Solved

The present disclosure aims to provide a nonlinear function operation device and method, to solve the problems of the related art that the operation speed is slow, the operation device has a large area, and the power consumption is high when calculating a nonlinear function.

Technical Solutions

One example aspect of the present disclosure provides an example apparatus for nonlinear function operations in a neural network. The example apparatus may include a table looking-up module configured to acquire a first address of a slope value k and a second address of an intercept value b based on a floating-point number. Further, the example apparatus may include a linear fitting module configured to obtain a linear function expressed as y=k×x+b based on the slope value k and the intercept value b, and substitute the floating-point number into the linear function to calculate a function value of the linear function, wherein the calculated function value is determined as the function value of a nonlinear function corresponding to the floating-point number.

The example aspect may further include an example method for nonlinear function operations in a neural network. The example method may include acquiring, by a table looking-up module, a first address of a slope value k and a second address of an intercept value b of a linear function among a plurality of linear functions based on the floating-point number, wherein the plurality of linear functions are obtained through piecewise-linear fitting of the nonlinear function; and obtaining, by a linear fitting module, a linear function expressed as y=k×x+b based on the slope value k and the intercept value b acquired, and substituting, by the linear fitting module, the floating-point number into the linear function to calculate a function value of the linear function, wherein the calculated function value is determined as the function value of the nonlinear function corresponding to the floating-point number.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The present disclosure provides a nonlinear function operation device and method. The device includes a controller, a table looking-up module and a linear fitting module.

The controller is configured to control the operation of the table looking-up module and the linear fitting module, the data transfer process and so on. The table looking-up module is configured to calculate/acquire a slope value k and an intercept value b based on a floating-point number or to calculate/acquire the storage location (address) of a slope value k and an intercept value b based on a floating-point number. The linear fitting module is configured to obtain a linear function expressed as y=k×x+b based on the slope value k and the intercept value b acquired from the slope and intercept storing module, and to substitute the floating-point number into the linear function to calculate a function value of the linear function, where the calculated function value is determined as a function value of the nonlinear function corresponding to the floating-point number. According to the disclosure, the nonlinear function is fitted as the plurality of linear functions, and, for different arguments, a linear function corresponding to each argument only needs to be selected. Consequently, only simple addition and multiplication operations are required during the operation. In this way, the hardware design can be simplified, the operation speed can be improved, and the power consumption and area of the chip can be reduced.

The present disclosure provides a nonlinear function operation device, which is configured to calculate a function value of a nonlinear function based on a floating-point number input. The device includes a controller, a table looking-up module and a linear fitting module.

The controller is configured to control the operation of other modules such as the table looking-up module and the linear fitting module. The controller may be a module specific to the device. When the device is part of other device (i.e., as a sub-module), the controller may also be part of the controller of the other device, that is, the table looking-up module and the linear fitting module are controlled by the controller of the parent module (i.e., the controller of the other device).

The slope and intercept storing module is configured to store slope values and intercept values of a plurality of linear functions, where the plurality of linear functions are obtained through piecewise-linear fitting of the nonlinear function. The slope and intercept storing module can be used as a separate component or as a sub-component of the table looking-up module or linear fitting module. The input of the slope and intercept storing module is the storage location (address) of the slope k and the intercept b to be read, and the output is the value of the corresponding slope k and intercept b.

The table looking-up module is configured to calculate a slope value and an intercept value based on an input floating-point number or to calculate the storage location (address) of a slope value and an intercept value based on an input floating-point number. The table looking-up module may include a selecting module and a slope and intercept storing module, or may include only the selecting module. The selecting module is configured to acquire the storage location (address) of a slope value k and an intercept value b based on the floating-point number, transfer the storage location (address) to the slope and intercept storing module, and then get the corresponding slope value and intercept value. Because a linear function can be determined based on a set of slope value and intercept value, the slope value and the intercept value for determining the linear function should have a corresponding relation in storage. The selecting module includes a configuration module and a parameter storage module. The configuration module is used for configuring the parameters required in the selection process, such as the slope values, the intercept values, and the like. The parameter storage module is used for storing other parameters besides slope and intercept.

The linear fitting module is configured to calculate a function value of the linear function expressed as y=k×x+b based on the slope value k and the intercept value b acquired from the slope and intercept storing module, where x is the input floating-point number of the device, i.e. argument, y is the output of the device. The linear fitting module includes a multiplier and an adder to calculate a function value of the linear function. The principle of the present disclosure is to fit a complex nonlinear function as multi-segment linear function. It should be known that, the smaller a segment interval is, the closer function values of a linear function and a nonlinear function, that is, the higher the precision of the fitting is. Which segment the input floating-point number falls within is determined, to determine a linear function corresponding to the segment determined, and then the floating-point number is substituted into the linear function to obtain a function value.

The link relationship between the slope and intercept storing module, the table looking-up module, and the linear fitting module in the present disclosure may be various.

Figure 5:
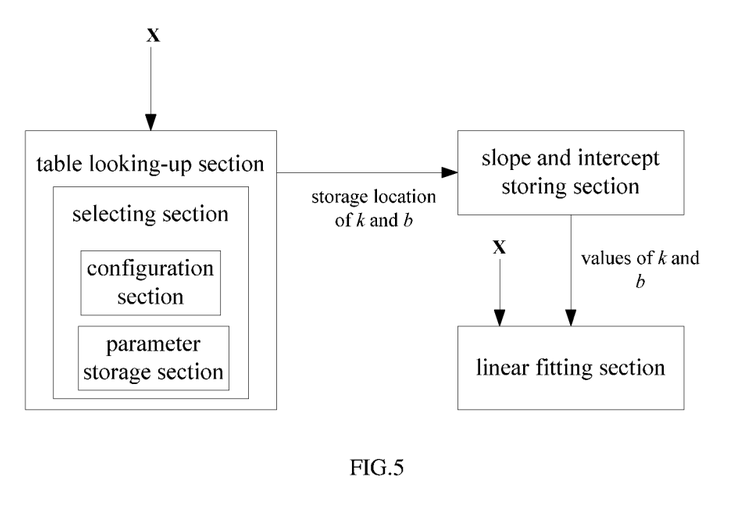
FIG. 5 is a schematic structural diagram illustrating a nonlinear function operation device according to an embodiment of the present disclosure.

As shown in FIG. 5, the slope and intercept storing module, the table looking-up module, and the linear fitting module may be three separate components, that is, the table looking-up module outputs the storage locations (address) of a slope value k and an intercept value b to the slope and intercept storing module, and obtains the slope value k and the intercept value b from the slope and intercept storing module, then the obtained slope value k and intercept value b are input to the linear fitting module for fitting.

Figure 6:
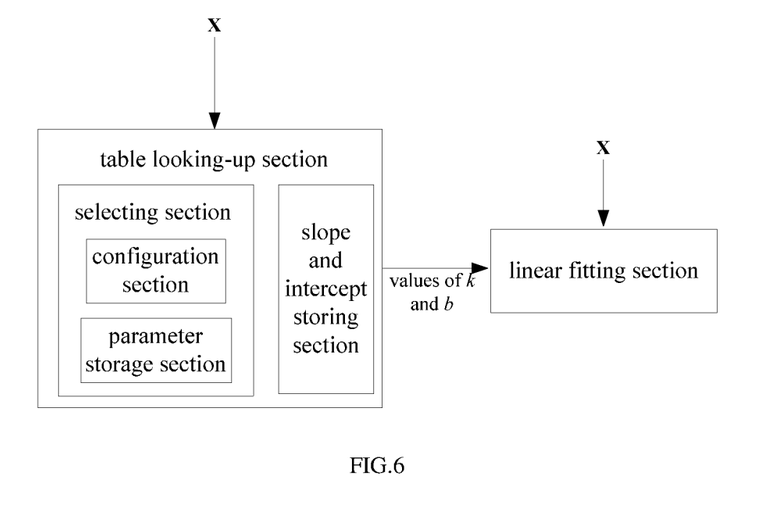
FIG. 6 is a schematic structural diagram illustrating a nonlinear function operation device according to an embodiment of the present disclosure.

As shown in FIG. 6, the slope and intercept storing module may be a sub-component of the table looking-up module, connects to the linear fitting module, that is, the table looking-up module obtains the slope value k and the intercept value b, and output the obtained slope value k and the intercept value b to the linear fitting module for fitting.

Figure 7:
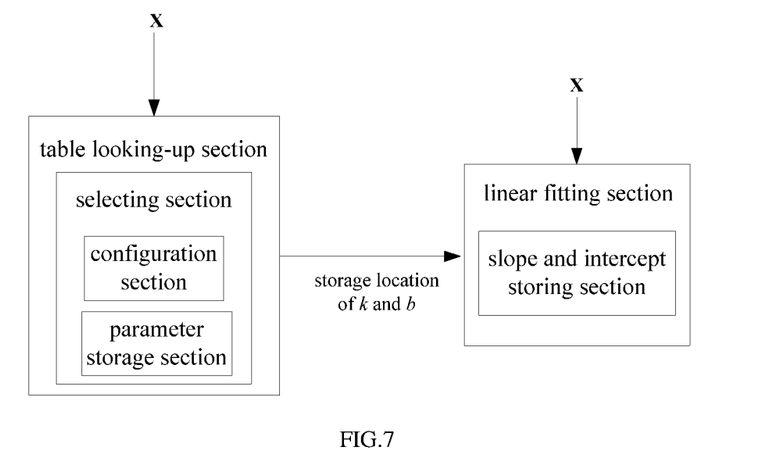
FIG. 7 is a schematic structural diagram illustrating a nonlinear function operation device according to an embodiment of the present disclosure.

As shown in FIG. 7, the slope and intercept storing module may be a sub-component of the linear fitting module, connects to the table looking-up module, that is, the table looking-up module outputs the storage locations (address) of a slope value k and an intercept value b to the linear fitting module, the linear fitting module obtains the slope value k and the intercept value b from the slope and intercept storing module and outputs fitting result.

According to an implementation of the present disclosure, the table looking-up module includes a slope and intercept storing module as well as a selecting module. The slope and intercept storing module is configured to store the slope values and the intercept values of the plurality of linear functions. The selecting module is configured to calculate the storage location of the slope value k and the intercept value b stored in the slope and intercept storing module based on the floating-point number. The selecting module includes a configuration module and a parameter storage module. The configuration module is used for configuring the parameters required in the selection process, such as the slope values, the intercept values, and the like. The parameter storage module is used for storing other parameters besides slope and intercept.

According to an implementation of the present disclosure, other parameters configured by the configuration module include:

N: the number of intervals, the configuration module is configured to divide a range of an argument of the nonlinear function into N intervals, to fit a nonlinear function in each interval as a linear function to obtain N linear functions, to acquire slope values and intercept values of the N linear functions, to store the slope values and the intercept values of the N linear functions in the slope and intercept storing module, where each set of slope value and intercept value is in one-to-one correspondence with a sequence number index of one of the N intervals, and to store the sequence number index in the selecting module, where the sequence number index ranges from [0, N−1]. Therefore, the selecting module is configured to obtain a sequence number index of a corresponding interval based on which interval the floating-point number falls within, and to acquire the slope value k and the intercept value b from the slope and intercept storing module based on the sequence number index obtained.

r: the range of the argument, when the parameter is configured as r, the configuration module is further configured to set the range of the argument of the nonlinear function as (−r, r), and to determine an exponent portion of a boundary value r to be an offset value bias to be input to the selecting module. The selecting module is configured to determine a sequence number index based on the floating-point number and the offset value bias, and to obtain a slope value and an intercept value based on the sequence number index determined. It should be noted that, a linear function cannot cover all values of the nonlinear function, so that the range of the argument of the nonlinear function can be set as (−r, r), to perform linear fitting in (−r, r). After setting the fitting range, in the case that the input floating-point number falls within (−r, r), a sequence number index can be obtained based on the range that the floating-point number falls into.

bias: the offset value, the configuration module is configured to handle this situation when the input floating-point number may not fall within the range of the argument, including:

Before the selecting module makes a selection, the configuration module stores the data transmitted from the outside in the parameter storage module in the configuration module and in the slope and intercept storing module. The source of the data can be registers, on-chip memory, off-chip memory, etc. The data transmission is controlled by the controller.

The specific implementation process of the selecting module is as follows, where all data, such as bias, exp, are stored in the storage unit of the selecting module (such as registers), The calculation operation is performed by the arithmetic unit in the selection module.

The sequence number index is expressed as N−1 when bias-exp<0 and the floating-point number is positive, or the sequence number index is expressed as 0 when bias-exp<0 and the floating-point number is negative, where exp is an exponent portion of the floating-point number.

The sequence number index is expressed as: index=$2^{W-1}+2^{W-1-m-1}$+frac[F−1:F−(W−1−m−1)+1] when 0⩽bias-exp<W−1, where frac is a mantissa of the floating-point number, W is a bit width of the sequence number index, W and m are calculated by W=log 2N, m=bias-exp, and F is a bit width of the mantissa of the floating-point number, and then an exclusive-or operation between each bit of the sequence number index and a sign bit of the floating-point number is performed.

The highest-order bit of the sequence number index is obtained by inverting the sign bit of the floating-point number and W−1 low-order bits of the sequence number index is the sign bit of the floating-point number, when bias-exp⩾W−1.

According to an implementation of the present disclosure, the linear fitting module includes a multiplier and an adder. The multiplier is configured to multiply the slope value k, obtained by the table looking-up module or the linear fitting module, by the floating-point number to obtain a multiplication result. The adder is configured to add the multiplication result obtained by the multiplier and the intercept value b obtained by the table looking-up module or the linear fitting module to obtain a function value y of the linear function.

The present disclosure further provides a nonlinear function operation method, which is configured to calculate a function value of a nonlinear function based on a floating-point number input. The method may include the follows.

At S0, the controller controls the configuration module to configure the device, including the various parameters described above, the slope and intercept of different linear functions;

At S1, based on the input floating-point number, the controller controls the selecting module to calculate the corresponding sequence number index, to select the corresponding slope value k and intercept value b, where the slope value k and the intercept value b are prepared in advance, are calculated through piecewise interpolation based on the nonlinear function that needs to be fitted, and are pre-stored in an external memory connected to the device;

At S2, the controller controls the linear fitting module to calculate a function value of the linear function expressed as y=k×x+b, based on the slope value k and the intercept value b acquired at S1.

According to an implementation of the present disclosure, the method may further include the follows.

At S0, the configuration module configures parameter N to divide a range of an argument of the nonlinear function into N intervals, the selecting module calculates the sequence number of the interval corresponding to the input floating point number according to the configured parameters bias, N, and the corresponding slope value and intercept value in the slope and intercept storing module are obtained. The linear fitting module multiplies the slope value by the input floating point number, the result is added to the intercept value, that is, the final output result (the fitting result of the nonlinear function) is obtained. In each interval the device fits a nonlinear function to a linear function, obtains N linear functions, and slope values and intercept values of the N linear functions are acquired, where each set of slope value and intercept value is in one-to-one correspondence with a sequence number index of one of the N intervals, and the sequence number index ranges from [0, N−1].

According to an implementation of the present disclosure, the operation S0 further includes the follows. The configuration module configures parameter r. The range of the argument of the nonlinear function is set as (−r, r), and an exponent portion of a boundary value r is determined to be an offset value bias. The operation S0 further includes the follows. A sequence number index is determined based on the floating-point number and the offset value bias, and a slope value and an intercept value are obtained based on the sequence number index determined.

According to an implementation of the present disclosure, in the above operation S1, the selecting module determines the sequence number index based on the floating-point number and the offset value bias that is a parameter in the configuration module, including:

When bias-exp<0 and the floating-point number is positive, the sequence number index is determined as N−1, or, when bias-exp<0 and the floating-point number is negative, the sequence number index is determined as 0, where exp is an exponent portion of the floating-point number.

When $0 \leq$ bias-exp$<W-1$, the sequence number index is determined to be expressed as index=$2^{W-1}+2^{W-1-m-1}$+frac[F-1: F-(W-1-m-1)+1], where frac is a mantissa of the floating-point number, W is a bit width of the sequence number index, W and m are calculated by W=log 2N, m=bias-exp, and F is a bit width of the mantissa of the floating-point number, and then an exclusive-or operation between each bit of the sequence number index and a sign bit of the floating-point number is performed.

When bias-exp$\geq W-1$, the highest-order bit of the sequence number index is determined as a value obtained by inverting the sign bit of the floating-point number, and W-1 low-order bits of the sequence number index are determined as the sign bit of the floating-point number.

To understand objectives, technical solutions, and advantages of the present disclosure more clearly and completely, take FIG. 6 as an example, the following further describes the present disclosure in detail with reference to specific embodiments and the accompanying drawings.

Figure 1:
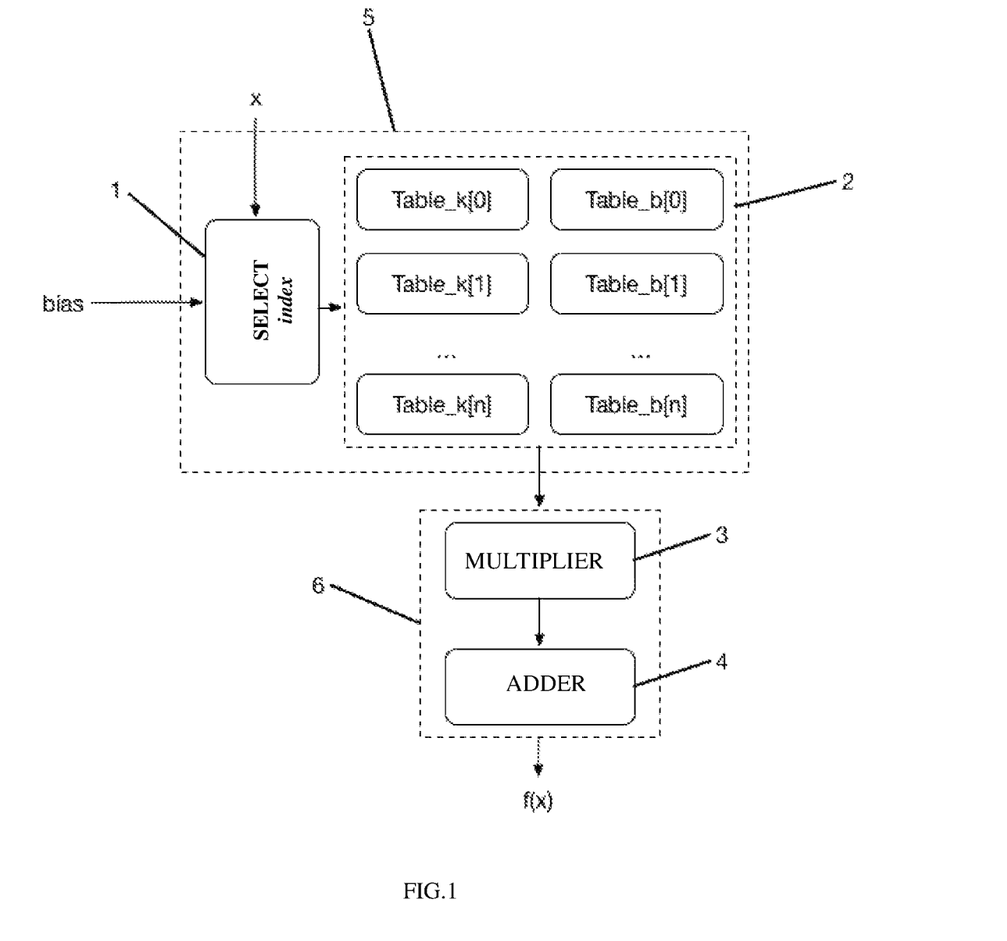
FIG. 1 is a schematic structural diagram illustrating a nonlinear function operation device according to an embodiment of the present disclosure.

FIG. 1 is a schematic structural diagram illustrating a nonlinear function operation device according to an embodiment of the present disclosure. As illustrated in FIG. 1, the nonlinear function operation device includes a table looking-up module 5 and a linear fitting module 6, where the table looking-up module 5 is configured to look up a slope value k and an intercept value b of piecewise-linear fitting, based on an argument x input and an externally configured offset bias.

The table looking-up module 5 includes a sequence number selecting module 1 and a slope and intercept storing module 2. The sequence number selecting module 1 is configured to calculate a sequence number index based on the argument x input and the externally configured offset bias. The slope and intercept storing module 2 is configured to select the slope and the intercept based on the sequence number index calculated by the sequence number selecting module 1.

The linear fitting module 6 is configured to obtain, through a linear fitting method, a final result based on the slope and the intercept obtained by the table looking-up module 5. The linear fitting module 6 includes a multiplier 3 and an adder 4. The multiplier 3 is configured to calculate k×x, and the adder 4 is configured to calculate k×x+b.

Figure 2:
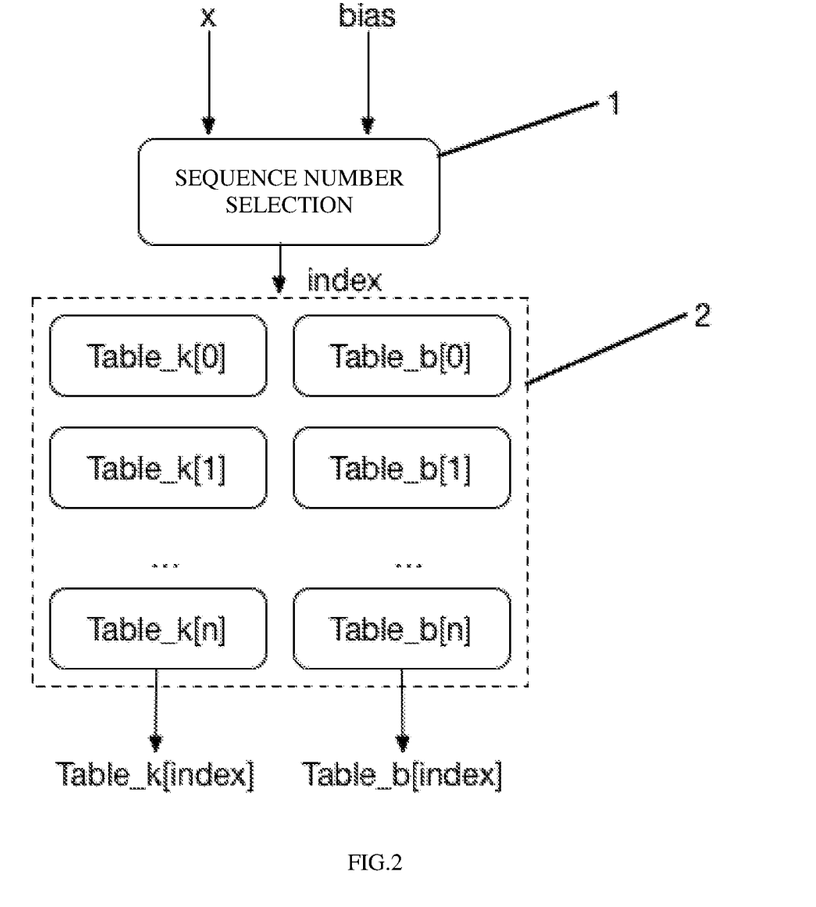
FIG. 2 is an internal schematic structural diagram illustrating a nonlinear function operation device according to an embodiment of the present disclosure.

FIG. 2 is an internal schematic structural diagram illustrating a nonlinear function operation device according to an embodiment of the present disclosure. As illustrated in FIG. 2, input values of the table looking-up module 5 include an argument of a nonlinear function and an offset value. The sequence number selecting module 1 is configured to calculate a sequence number index based on the argument x and the offset value.

In slope and intercept storing module 2, Table_k is configured to store slope values and Table_b is configured to store intercept values, where the slope values and the intercept values are obtained by piecewise-linear fitting of the nonlinear function. Values in Table_k and Table_b are configurable. A value of Table_k and a value of Table_b should have been configured before starting the calculation. A slope Table_k[index] and an intercept Table_b[index] to be used are selected based on the sequence number index calculated above.

Figure 3:
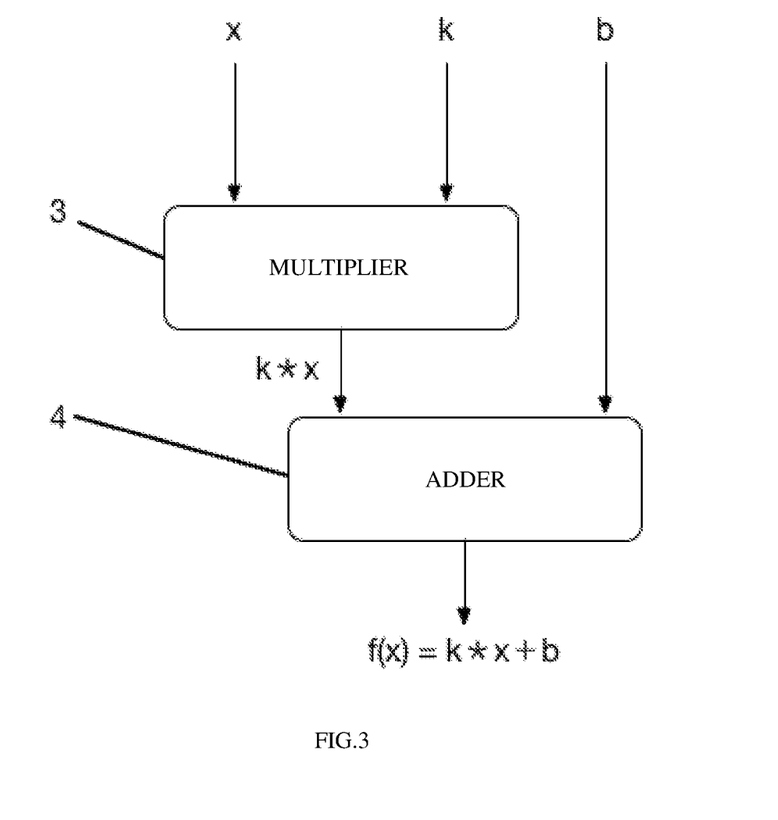
FIG. 3 is an internal schematic structural diagram illustrating a linear fitting module according to an embodiment of the present disclosure.

FIG. 3 is an internal schematic structural diagram illustrating a linear fitting module according to an embodiment of the present disclosure. As illustrated in FIG. 3, the linear fitting module 6 has three inputs, where x represents an argument, that is, an external input value that requires nonlinear transformation, k represents a slope and b represents an intercept both of which are obtained through looking up a table. An output of the linear fitting module 6 is a final result f(x). That is, the operation achieved by the linear fitting module 6 is f(x)=k×x+b.

Figure 4:
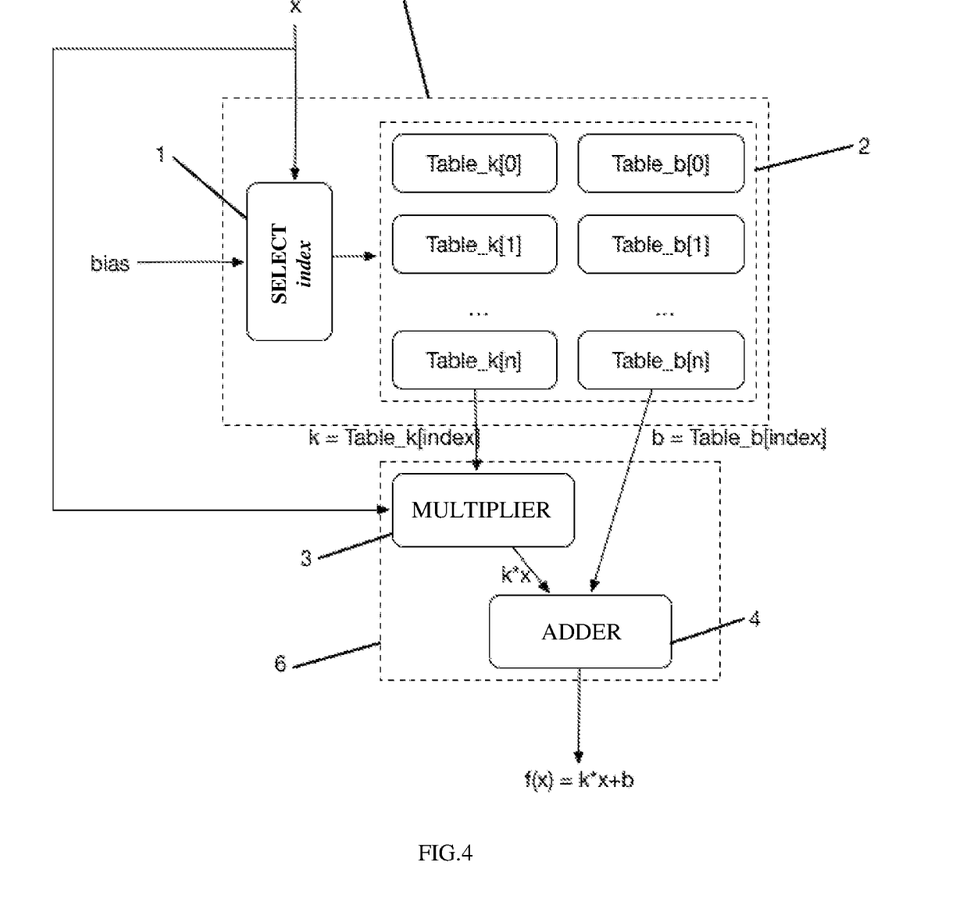
FIG. 4 is a principle diagram of a nonlinear function operation according to an embodiment of the present disclosure.

FIG. 4 is a principle diagram of a nonlinear function operation according to an embodiment of the present disclosure. As illustrated in FIG. 4, an input of a table looking-up module 3 is an argument x. A looking-up module 3 looks up a slope k and an intercept b based on a value of the argument x and outputs the slope k and the intercept b, and then the multiplier 4 calculates k×x to output a result calculated and the intercept b, the adder 5 calculates k×x+b to obtain a final result.

In the following, take a nonlinear function $$\frac{1}{1+e^{-x}}$$

as an example to further explain the present disclosure. A range of an argument x of the nonlinear function is divided into N intervals, where N=64. A parameter r is set to 7.75, that is, the range of the argument x is (-7.75, 7.75). An interpolation table obtained through linearly fitting the above nonlinear function is as follows.

table_k=[0, 0.00048656316525353121, 0.00061973162484223741, 0.00078928936655365655, 0.0010051440297105911, 0.0012798783909594086, 0.0016294587358847128, 0.0020741221116775564, 0.0026394821537513336, 0.0033578984220486922, 0.0042701575375603202, 0.0054275134806431417, 0.0068941251757849761, 0.0087499054356052815, 0.011093746329263701, 0.014046996903534316, 0.017756918346970331, 0.022399600632704755, 0.028181459980468879, 0.035337917880121604, 0.044127182785956003, 0.054816271160400852, 0.067655703617413618, 0.082839110694275894, 0.10044501610076587, 0.12036137423557895, 0.14220006304664759, 0.16521866898611015, 0.18827848066541336, 0.20987496057486665, 0.22827132183028082, 0.24173985504038351, 0.24887167444405783, 0.24887167444405978, 0.24173985504038323, 0.22827132183028037, 0.20987496057486754, 0.18827848066541422, 0.16521866898610904, 0.14220006304664773, 0.1203613742355779, 0.10044501610076662, 0.082839110694276047, 0.067655703617414242, 0.054816271160399312, 0.044127182785955642, 0.035337917880122131, 0.028181459980469011, 0.022399600632704762, 0.017756918346970005, 0.014046996903534123, 0.011093746329263798, 0.0087499054356035919, 0.0068941251757841807, 0.0054275134806434523, 0.0042701575375596592, 0.0033578984220488948, 0.0026394821537508726, 0.0020741221111678265, 0.0016294587358859139, 0.0012798783909593549, 0.0010051440029710878, 0.00078928936655333173, 0.00061973162484123137, 0.00048656316525207165, 0].

table_b=[0, 0.0041993251816466815, 0.0051986385576176901, 0.0064299574345850303, 0.0079452052890187242, 0.0098072382389360040, 0.012091883136726765, 0.01489024369806616, 0.018311254971669941, 0.022484429652995856, 0.027562682295467392, 0.033725030746198308, 0.041178847029904868, 0.050161149061534412,
0.060938175678893231, 0.073802158887859029,
0.089063797665378613, 0.10703847125951904,
0.12802378192384653, 0.15226575415464311,
0.17991125218316206, 0.21094542275377304,
0.24511595347355658, 0.28185147996324666,
0.32019008490568668, 0.35874483153772002,
0.39574347031640295, 0.42918193126900617,
0.45711585573612518, 0.47807264767380625,
0.4915012059787659, 0.49811232472098371,
0.49994440545964863, 0.50005559454035076,
0.50188767527901634, 0.50849879402123443,
0.52192735232619281, 0.54288414426387344,
0.57081806873099528, 0.60425652968359678,
0.6412551684622817, 0.67980991509431143,
0.71814852003675334, 0.75488404652644192,
0.78905457724623107, 0.82008874781683905,
0.84773424584535517, 0.87197621807615311,
0.8929615287404804, 0.9109362023346228,
0.92619784111214154, 0.93906182432110619,
0.94983885093847398, 0.95882115297009929,
0.96627496925379974, 0.97243731770453612,
0.97751557034700309, 0.98168874502833281,
0.98510975630192921, 0.98790811686326541,
0.99019276176106386, 0.9920547947109799,
0.99357004256541748, 0.99480136144239018,
0.99580067481836443, 1].

When the input argument x is equal to 0.25 which is a 16-bit floating-point decimal number, an exponent portion exp of the 16-bit floating-point decimal number is 13, a mantissa frac is b'0000000000, an offset value bias is 17, and m calculated by bias-exp is 4. In this case, the calculated m falls within a range $0 \leq$ bias-exp$<W-1$, a sequence number index will be determined to be expressed as 26−1+26−1−4−1+frac[16−1:16−(6−1−4−1)+1], that is, 25+20+0=33.

Based on the sequence number index determined, the slope k is determined as k[33]=0.248871674444 and the intercept b is determined as b[33]=0.50005559454, where the slope k and the intercept b are selected from the above interpolation table. Accordingly, the value of k×x+b is determined as 0.562273513151, while the result calculated through linear fitting method is 0.562176500886 with an error of −9.7012265e-05.

In summary, the present disclosure adopts a linear fitting method to avoid complex operations, for example, a logarithmic operation. By adopting faster operations, such as multiplication, addition, and the like, the calculation speed can be increased. Meanwhile, complicated hardware design can be avoided, such as, a log 2x operation unit, reducing the area and power consumption of the chip.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A nonlinear function operation device, comprising:
    a table looking-up circuit configured to
    acquire a first address of a slope value k and a second address of an intercept value b based on a floating-point number;
    a linear fitting circuit configured to
    obtain a linear function expressed as y=k×x+b based on the slope value k and the intercept value b, and
    substitute the floating-point number into the linear function to calculate a function value of the linear function, wherein the calculated function value is determined as the function value of a nonlinear function corresponding to the floating-point number; and
    a slope and intercept storing circuit configured to store multiple slope values and multiple intercept values of a plurality of linear functions,
    wherein the plurality of linear functions are obtained through piecewise-linear fitting of the nonlinear function,
    wherein the table looking-up circuit comprises a selecting circuit configured to acquire the first address of the slope value k and the second address of the intercept value b based on the floating-point number,
    wherein the selecting circuit comprises a configuration circuit configured to:
    divide a range of an argument of the nonlinear function into N intervals,
    fit a nonlinear function in each interval as a linear function to obtain N linear functions,
    acquire slope values and intercept values of the N linear functions to store the slope values and the intercept values of the N linear functions in the slope and intercept storing circuit, wherein each set of slope value and intercept value is in one-to-one correspondence with a sequence number index of one of the N intervals, and
    store the sequence number index in the selecting circuit, wherein the sequence number index ranges from [0, N−1], and
    wherein the configuration circuit is further configured to:
    set the range of the argument of the nonlinear function as (−r, r), and
    determine an exponent portion of a boundary value r to be an offset value bias to be input to the selecting circuit wherein the selecting circuit is configured to determine a sequence number index based on the floating-point number and the offset value bias, and to obtain a slope value and an intercept value based on the sequence number index determined.

2. The device of claim 1, wherein the table looking-up circuit is further configured to acquire the slope value k and the intercept value b from the multiple slope values and multiple intercept values stored in the slope and intercept storing circuit based on the first address of the slope value k and the second address of the intercept value b.

3. The device of claim 1, wherein the table looking-up circuit is further configured to transmit the first address of the slope value k and the second address of the intercept value b.

4. The device of claim 1, wherein the linear fitting circuit is configured to acquire the slope value k and the intercept value b from the multiple slope values and multiple intercept values stored in the slope and intercept storing circuit based on the first address and the second address.

5. The device of claim 1, wherein the selecting circuit is configured to:
    determine the sequence number index as N−1 when bias-exp<0 and the floating-point number is positive, wherein exp is an exponent portion of the floating-point number.

6. The device of claim 1, wherein the selecting circuit further comprises a parameter storage circuit configured to store a count of the intervals, the range of the argument, and the offset value bias.

7. The device of claim 1, wherein the linear fitting circuit comprises:
a multiplier configured to multiply the slope value k, obtained through the table looking-up circuit, by the floating-point number to obtain a multiplication result; and
an adder configured to add the multiplication result obtained by the multiplier and the intercept value b obtained through the table looking-up circuit to obtain a function value y of the linear function.

8. The device of claim 1, wherein the selecting circuit is configured to:
determine the sequence number index as 0 when bias-exp<0 and the floating-point number is negative, wherein exp is an exponent portion of the floating-point number.

9. The device of claim 1, wherein the selecting circuit is configured to:
determine the sequence number index to be expressed as:

$$\text{index}=2^{W-1}+2^{W-1-m-1}+\text{frac}[F-1{:}F-(W-1-m-1)+1]$$

when $0 \leq \text{bias-exp} < W-1$, wherein frac is a mantissa of the floating-point number, W is a bit width of the sequence number index, W and m are calculated by W=log 2N, m=bias-exp, and F is a bit width of the mantissa of the floating-point number, and then an exclusive-or operation between each bit of the sequence number index and a sign bit of the floating-point number is performed.

10. The device of claim 1, wherein the selecting circuit is configured to determine the highest-order bit of the sequence number index as a value obtained by inverting the sign bit of the floating-point number and W−1 low-order bits of the sequence number index as the sign bit of the floating-point number, when $\text{bias-exp} \geq W-1$.

11. A nonlinear function operation method, comprising:
acquiring, by a table looking-up circuit, a first address of a slope value k and a second address of an intercept value b of a linear function among a plurality of linear functions based on a floating-point number, wherein the plurality of linear functions are obtained through piecewise-linear fitting of the nonlinear function; and
obtaining, by a linear fitting circuit, a linear function expressed as y=k×x+b based on the slope value k and the intercept value b acquired, and
substituting, by the linear fitting circuit, the floating-point number into the linear function to calculate a function value of the linear function, wherein the calculated function value is determined as the function value of the nonlinear function corresponding to the floating-point number,
dividing a range of an argument of the nonlinear function into N intervals, fitting a nonlinear function in each interval as a linear function to obtain N linear functions, and
acquiring slope values and intercept values of the N linear functions; wherein each set of slope value and intercept value is in one-to-one correspondence with a sequence number index of one of the N intervals, and the sequence number index ranges from [0, N−1],
wherein the dividing further comprises:
setting the range of the argument of the nonlinear function as (−r, r), and
determining an exponent portion of a boundary value r to be an offset value bias; and
wherein the acquiring of the slope value comprises:
determining a sequence number index based on the floating-point number and the offset value bias, and obtaining a slope value and an intercept value based on the sequence number index determined.

12. The method of claim 11, further comprising storing, by a slope and intercept storing circuit, multiple slope values and multiple intercept values of a plurality of linear functions, wherein the plurality of linear functions are obtained through piecewise-linear fitting of the nonlinear function.

13. The method of claim 12, further comprising acquiring, by the table looking-up circuit, the slope value k and the intercept value b from the multiple slope values and multiple intercept values stored in the slope and intercept storing circuit based on the first address of the slope value k and the second address of the intercept value b.

14. The method of claim 12, further comprising transmitting, by table looking-up circuit, the first address of the slope value k and the second address of the intercept value b.

15. The method of claim 12, further comprising acquiring, by the linear fitting circuit, the slope value k and the intercept value b from the multiple slope values and multiple intercept values stored in the slope and intercept storing circuit based on the first address of the slope value k and the second address of the intercept value b.

16. The method of claim 11, wherein the determining the sequence number index based on the floating-point number and the offset value bias comprises:
determining the sequence number index as N−1 when bias-exp<0 and the floating-point number is positive, wherein exp is an exponent portion of the floating-point number.

17. The method of claim 11, wherein the determining the sequence number index based on the floating-point number and the offset value bias comprises:
determining the sequence number index as 0 when bias-exp<0 and the floating-point number is negative, wherein exp is an exponent portion of the floating-point number.

18. The method of claim 11, wherein the determining the sequence number index based on the floating-point number and the offset value bias comprises:
determining the sequence number index to be expressed as:

$$\text{index}=2^{W-1}+2^{W-1-m-1}+\text{frac}[F-1{:}F-(W-1-m-1)+1]$$

when $0 \leq \text{bias-exp} < W-1$, wherein frac is a mantissa of the floating-point number, W is a bit width of the sequence number index, W and m are calculated by W=log 2N, m=bias-exp, and F is a bit width of the mantissa of the floating-point number, and then an exclusive-or operation between each bit of the sequence number index and a sign bit of the floating-point number is performed.

19. The method of claim 11, wherein the determining the sequence number index based on the floating-point number and the offset value bias comprises:
determining the highest-order bit of the sequence number index as a value obtained by inverting the sign bit of the floating-point number and W−1 low-order bits of the sequence number index as the sign bit of the floating-point number, when $\text{bias-exp} \geq W-1$.

* * * * *